(12) United States Patent
Wu et al.

(10) Patent No.: US 9,106,908 B2
(45) Date of Patent: Aug. 11, 2015

(54) VIDEO COMMUNICATION WITH THREE DIMENSIONAL PERCEPTION

(75) Inventors: Yi Wu, San Jose, CA (US); Wei Sun, San Jose, CA (US); Michael M. Chu, Cupertino, CA (US); Ermal Dreshaj, Santa Clara, CA (US); Philip Muse, Folsom, CA (US); Lucas B. Ainsworth, Portland, OR (US); Garth Shoemaker, Sunnyvale, CA (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 13/561,131

(22) Filed: Jul. 30, 2012

(65) Prior Publication Data

US 2014/0028794 A1 Jan. 30, 2014

(51) Int. Cl.
*H04N 15/00* (2006.01)
*H04N 13/00* (2006.01)
(Continued)

(52) U.S. Cl.
CPC ......... *H04N 13/0477* (2013.01); *H04N 5/2226* (2013.01); *H04N 5/23219* (2013.01); *H04N 13/004* (2013.01); *H04N 13/0048* (2013.01);
(Continued)

(58) Field of Classification Search
USPC ............. 348/43, 42, 44, 46, 47, 51, 143, 169, 348/208.14, 211.14, 211.1, 399.1, 558, 586, 348/587, 725, 719; 382/103, 118, 154, 162, 382/164
See application file for complete search history.

(56) References Cited

U.S. PATENT DOCUMENTS 6,335,765 B1 * 1/2002 Daly et al. .................... 348/586
6,819,796 B2 * 11/2004 Hong et al. ................... 382/173
(Continued)

FOREIGN PATENT DOCUMENTS

KR 10-2003-0062043 A 7/2003
WO 2011/083092 A1 7/2011
(Continued)

OTHER PUBLICATIONS

International Search Report and Written Opinion received for PCT Patent Application No. PCT/US2013/051844, mailed on Nov. 22, 2013, 15 pages.
(Continued)

*Primary Examiner* — Jefferey Harold
*Assistant Examiner* — Mustafizur Rahman
(74) *Attorney, Agent, or Firm* — Grossman, Tucker, Perrault & Pfleger, PLLC (57) ABSTRACT

Generally, this disclosure provides methods and systems for real-time video communication with three dimensional perception image rendering through generated parallax effects based on identification, segmentation and tracking of foreground and background layers of an image. The system may include an image segmentation module configured to segment a current local video frame into a local foreground layer and a local background layer and to generate a local foreground mask based on an estimated boundary between the local foreground layer and the local background layer; a face tracking module configured to track a position of a local user's face; a background layer estimation module configured to estimate a remote background layer; and an image rendering module configured to render a 3D perception image based on the estimated remote background layer, the current remote video frame and the remote foreground mask.

23 Claims, 6 Drawing Sheets

(51) Int. Cl.
*H04N 13/04* (2006.01)
*H04N 5/222* (2006.01)
*H04N 5/232* (2006.01)

(52) U.S. Cl.
CPC .... *H04N 13/0059* (2013.01); *H04N 2013/0092* (2013.01); *H04N 2213/006* (2013.01)

(56) References Cited

U.S. PATENT DOCUMENTS

| | | | |
|---|---|---|---|
| 7,085,401 B2* | 8/2006 | Averbuch et al. | 382/103 |
| 7,825,948 B2* | 11/2010 | Van Geest et al. | 348/51 |
| 8,437,393 B2* | 5/2013 | Park et al. | 375/240.12 |
| 2003/0174773 A1* | 9/2003 | Comaniciu et al. | 375/240.08 |
| 2005/0285875 A1* | 12/2005 | Kang et al. | 345/629 |
| 2005/0286759 A1* | 12/2005 | Zitnick et al. | 382/154 |
| 2007/0098218 A1* | 5/2007 | Zhang et al. | 382/103 |
| 2007/0133880 A1* | 6/2007 | Sun et al. | 382/195 |
| 2008/0095436 A1* | 4/2008 | Kim et al. | 382/173 |
| 2009/0097728 A1* | 4/2009 | Lee et al. | 382/131 |
| 2009/0219379 A1* | 9/2009 | Rossato et al. | 348/14.01 |
| 2011/0090149 A1 | 4/2011 | Larsen et al. | |
| 2011/0109620 A1* | 5/2011 | Hong et al. | 345/419 |
| 2011/0304708 A1* | 12/2011 | Ignatov | 348/51 |
| 2012/0114240 A1 | 5/2012 | Yamada | |
| 2012/0154531 A1* | 6/2012 | Kim et al. | 348/43 |
| 2012/0162384 A1 | 6/2012 | Vesely et al. | |
| 2012/0194693 A1* | 8/2012 | Samadani et al. | 348/222.1 |
| 2012/0320158 A1* | 12/2012 | Junuzovic et al. | 348/46 |

FOREIGN PATENT DOCUMENTS

| | | |
|---|---|---|
| WO | 2013039470 | 3/2013 |
| WO | 2013048482 | 4/2013 |

OTHER PUBLICATIONS

Rosenfeld et al., "Sequential Operations in Digital Picture Processing", Journal of ACM, 1966.
Rother, et al., "GrabCut—Interactive Foreground Extraction Using Interated Graph Cuts", ACT Transactions on Graphics, 2004.
3d Video Communication System—NTT MoPaCP #DigInfo found at: https://www.youtube.com/watch?v=H3ZVNfu4E6w.

* cited by examiner

VIDEO COMMUNICATION WITH THREE DIMENSIONAL PERCEPTION

FIELD

The present disclosure relates to real-time video communication, and more particularly, to real-time video communication with three dimensional perception.

BACKGROUND

Video communication, for example between a local user and a remote user, each at a computer, is becoming increasingly common and available. This may be attributed to the prevalence of personal computers with built in video cameras and microphones as well as the increasing availability of high speed internet connectivity. Most video communications are limited to providing a two dimensional (2D) screen image, however, due to the increased hardware complexity that is typically associated with three dimensional (3D) imaging. These complexities may include the use of dual cameras, costly display technology and difficulties with synchronization and calibration.

3D Video communication is desirable, however. Depth perception provides visual cues to the user and these cues may enhance a sense of realism and space associated with the communication experience. The quality and satisfaction of the user experience may thus be increased if depth perception could be provided at reduced cost and without the requirement for additional hardware, such as a second camera or complex display.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for real-time video communication with three dimensional (3D) perception image rendering through generated parallax effects based on identification, segmentation and tracking of foreground and background layers of an image. A local video image frame may be obtained from a local camera, in a local system or platform, and segmented into a foreground layer and a background layer. Information relating to the layer boundaries may be transmitted, along with the local video image, to a remote system. The remote system may similarly provide a remote video image and associated layer boundary information to the local system. The position of a local user's face may be detected and tracked over multiple video frames. The local system may generate an image with 3D perception to be displayed on a local display to the local user through the introduction of motion parallax where the remote foreground and remote background layers are moved relative to each other. The relative motion is controlled by tracking the local user's face position. The background motion may be at a reduced rate relative to the foreground motion, enabling 3D perception in real-time video streaming using a single camera at each platform.

Figure 1:
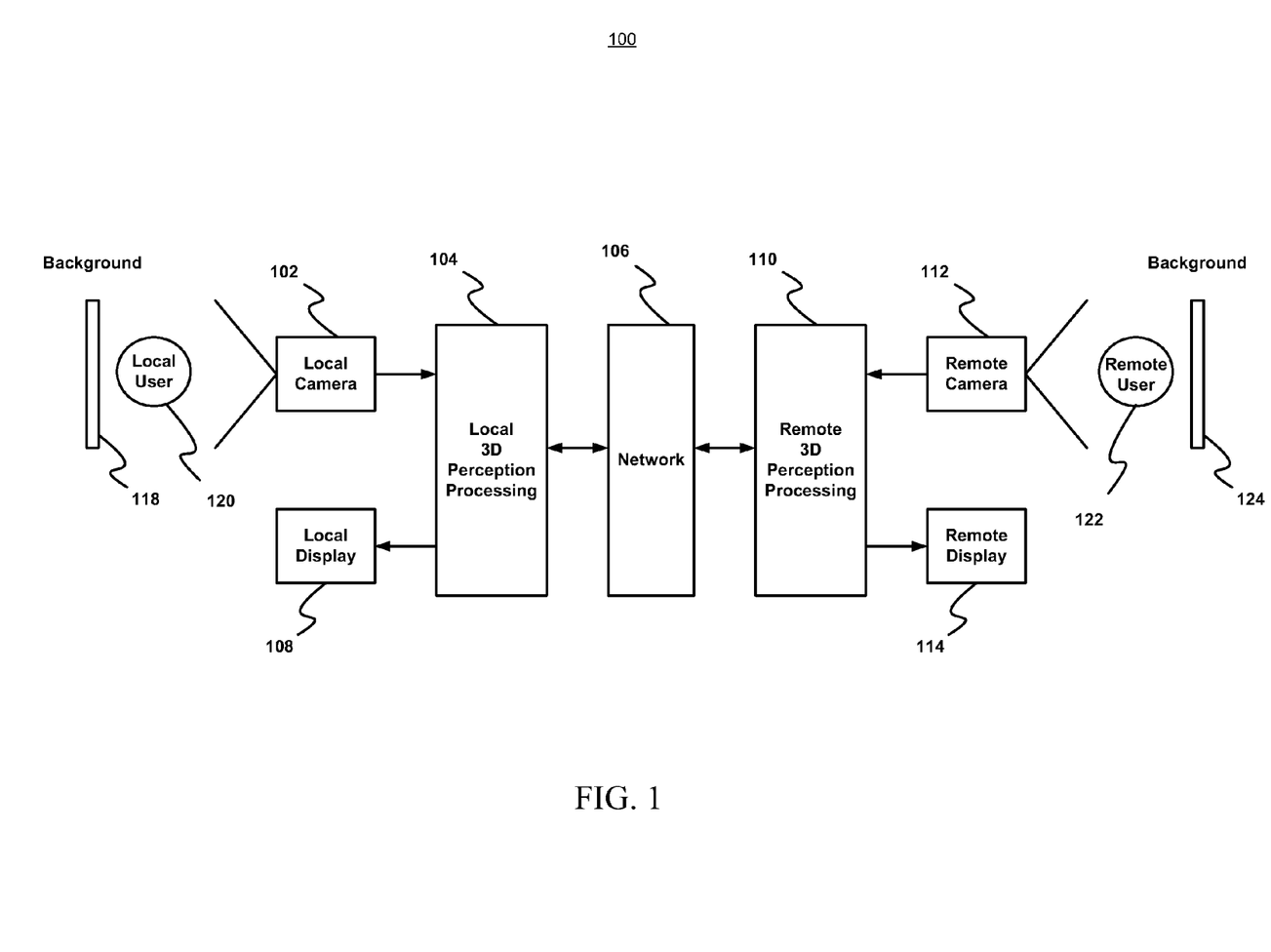
FIG. 1 illustrates a top level system diagram of one exemplary embodiment of a video communication system consistent with the present disclosure.

FIG. 1 illustrates a top level system diagram 100 of one exemplary embodiment consistent with the present disclosure. The system may provide streaming video communication with 3D perception between a local user 120 and a remote user 122. A local video camera 102 obtains one or more image frames which may include a local user 120 in front of a background scene or environment 118. The local video camera 102 may be associated with or integrated into a local computer system or platform such as, for example, a laptop computer or a computer monitor, or it may be a standalone camera. In some embodiments, the local video camera 102 may obtain both a color video image and depth image, as will be explained in greater detail below. The local image frames may be provided to a local 3D perception processing module 104 which may segment the image into local foreground and background layers, creating a local foreground mask and tracking the position of the local user's face, as will be explained in greater detail below. The local foreground mask and local video color frame may then be transmitted over network 106 to a remote 3D perception processing module 110 associated with a remote computer system or platform for the remote user 122. The remote 3D perception processing module 110 may provide the same or similar functionality for the remote user 122 that the local 3D perception processing module provides for the local user 120.

The local 3D perception processing module 104 may receive, over network 106, a remote video color frame and remote foreground mask which may be used, along with the tracked position of the local user's face, to render an image of the remote user and remote background on the local display 108 with 3D perception. The 3D perception may be based on parallax motion that is generated between the displayed foreground, e.g., the remote user, and the displayed remote background environment in response to position of the local user's face. For example, when the local user's face moves in the local user's left direction, the remote user will appear to move right with respect to the remote background on the local viewing display.

In the discussion that follows, attention will focus on video communication from the perspective of the local user. It will be appreciated, however, that this is done for convenience of explanation and that the principles disclosed and the exemplary embodiments described may equally serve for communications with respect to the remote user. Thus, bi-directional streaming video communication with 3D perception may be achieved. Additionally, in the descriptions that follow, the local and remote systems may be considered to mirror each other in functionality as a preferred embodiment. It will be appreciated, however, that in alternate embodiments, any or all of the described processing blocks may be re-distributed between local and remote platforms based on suitability and convenience for a particular application or implementation.

In some embodiments, both the local image and the remote image may be displayed, for example in a side by side layout, on either or both of the local and remote displays. In such cases, it will be appreciated that the 3D perception rendering techniques disclosed herein may be applied with respect to any or all such images.

Figure 2:
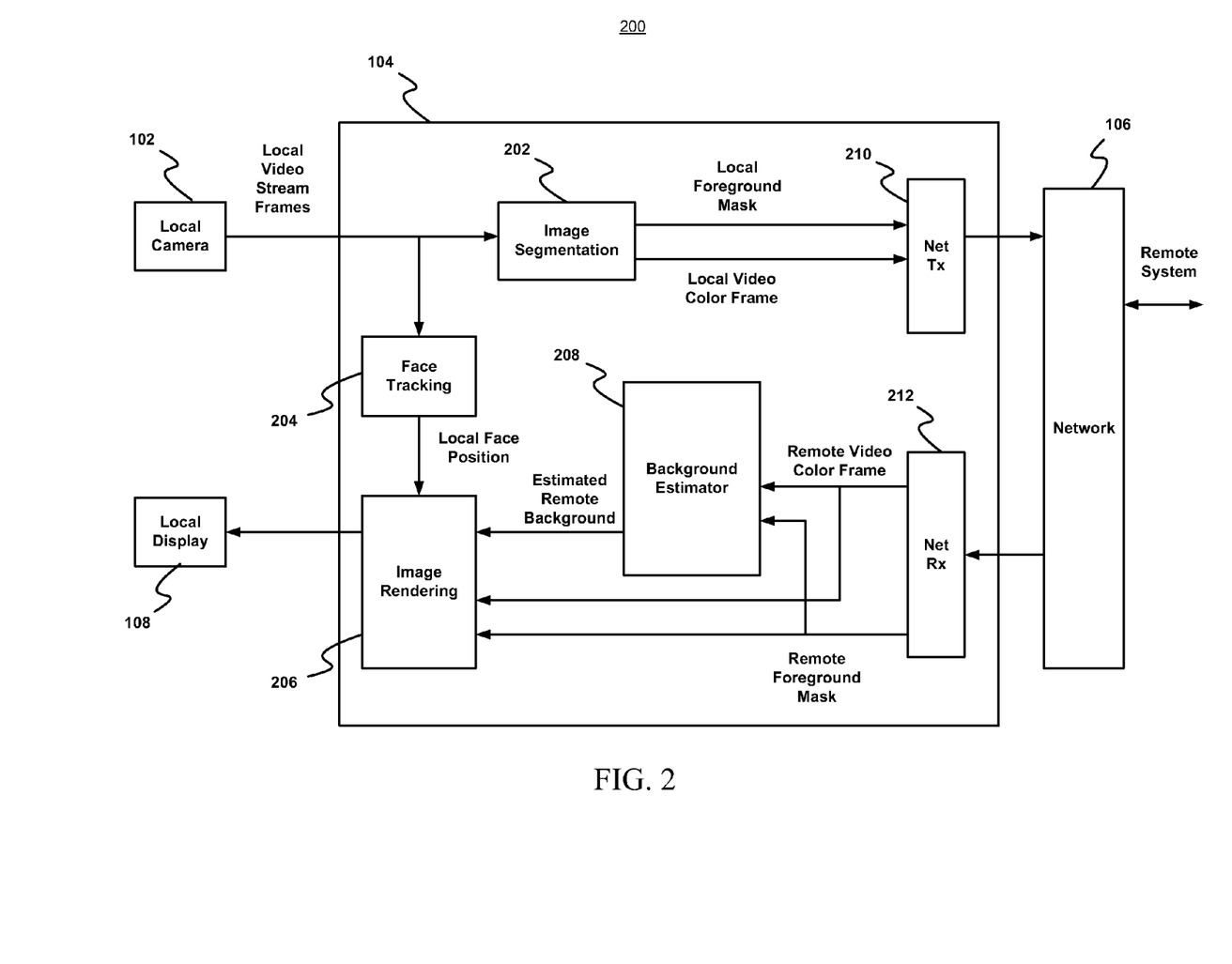
FIG. 2 illustrates a block diagram of one exemplary embodiment of a video communication system consistent with the present disclosure.

FIG. 2 illustrates a block diagram 200 of one exemplary embodiment of the video communication system consistent with the present disclosure. Local 3D perception processing module 104 is shown to include image segmentation module 202, face tracking module 204, background estimation module 208 and image rendering module 206. Image segmentation module 202 may segment an image from the local video stream provided by local camera 102 into a local foreground layer and a local background layer. A local foreground mask may be generated based on an estimated boundary between the foreground and background layers as will be described in greater detail below. The network transmission module 210 may send the local foreground mask over network 106 to the remote system along with the local video frame. In some embodiments, described below, the local video frame may comprise both image depth information and color image information, in which case the image depth information component may not need to be sent to the remote system.

Face tracking module 204 may track the position of the local user's face. The position of the face is tracked temporally from image frame to image frame of the local video stream. The face tracking module is able to determine, for example, when the user moves from left to right, or vice versa, within the image frame.

The network reception module 212 receives the remote video color frame and the remote foreground mask over network 106 from the remote system. The remote video color frame may include both a remote background and a remote foreground, for example, of the remote user. The background estimation module 208 accepts as input the remote video color frame and the remote foreground mask, and extracts the remote background layer. The background estimation module 208 then generates an estimate of the remote background layer including regions of the remote background that may currently be obscured from view by remote foreground objects, as will be described in greater detail below.

The estimated remote background, the remote video color frame, the remote foreground mask and the local tracked face position are all provided to the image rendering module 206. The image rendering module 206 extracts the remote foreground image from the remote video color frame based on the remote foreground mask and composites the extracted remote foreground onto the estimated remote background at an offset position that is determined by local tracked face position. The offset, which may differ from frame to frame as the local user moves, generates a parallax based 3D perception in the rendered image. An offset displacement for the background image, $O_1$, may be calculated as $O_1 = +k_b*d$, and an offset displacement for the foreground image, $O_2$, may be calculated as $O_2 = -k_f*d$, where d represents the motion vector, including distance and direction, associated with the local tracked face position. The scale factors, $k_b$ and $k_f$ are generally in the range of 0 to 1. The negative sign preceding the $k_f$ factor indicates that the foreground offset is in the opposite direction of the local user motion.

Figure 3:
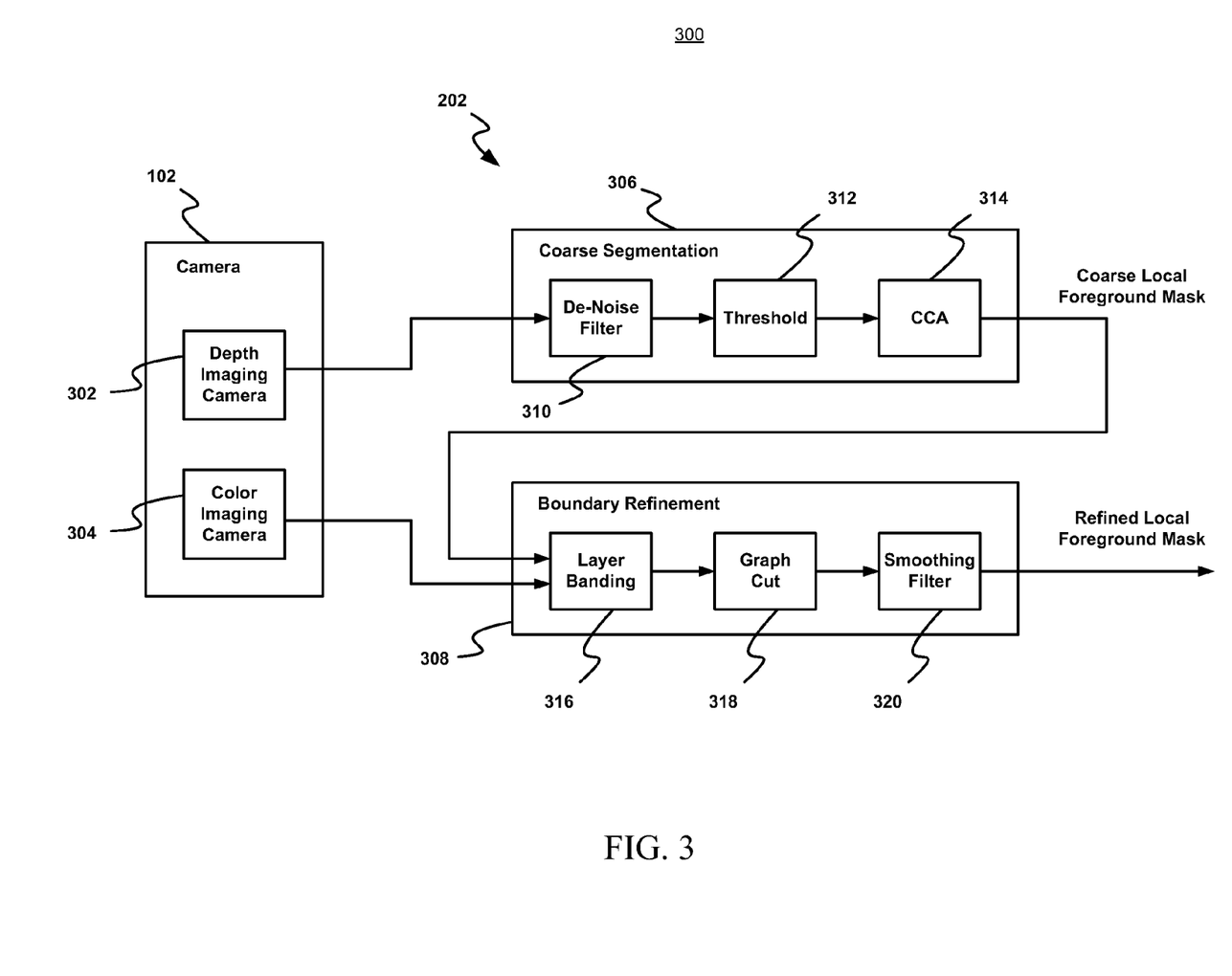
FIG. 3 illustrates additional block diagram details of a foreground segmentation module of an exemplary embodiment consistent with the present disclosure.

FIG. 3 illustrates additional block diagram details 300 of an exemplary embodiment of the image segmentation module 202 consistent with the present disclosure. Image segmentation module 202 is shown to include a coarse segmentation module 306 and a boundary refinement module 308. Local camera 102 is shown to include a depth imaging camera 302 and a color imaging camera 304. Depth imaging camera 302 may be temporally synchronized and spatially aligned with color imaging camera 304. Coarse segmentation module 306 obtains depth image data from depth imaging camera 302 and applies de-noise filtering 310, thresholding 312 and connected component analysis (CCA) 314 to generate a coarse local foreground mask. In some implementations, de-noise filter 310 may be a median filter or a level-set filter. Thresholding module 312 may segment the image into initial foreground and background layers based on thresholding of the depth data. Adaptive thresholding may be employed based on an assumption that depth data in video communications have a bi-modal probability distribution. For example an optimum threshold may be selected from a histogram of each depth image using k-means clustering where k=2. Connected component analysis module 314 may filter out the relatively smaller regions in the foreground mask to generate a foreground mask with improved connectivity.

Figure 4:
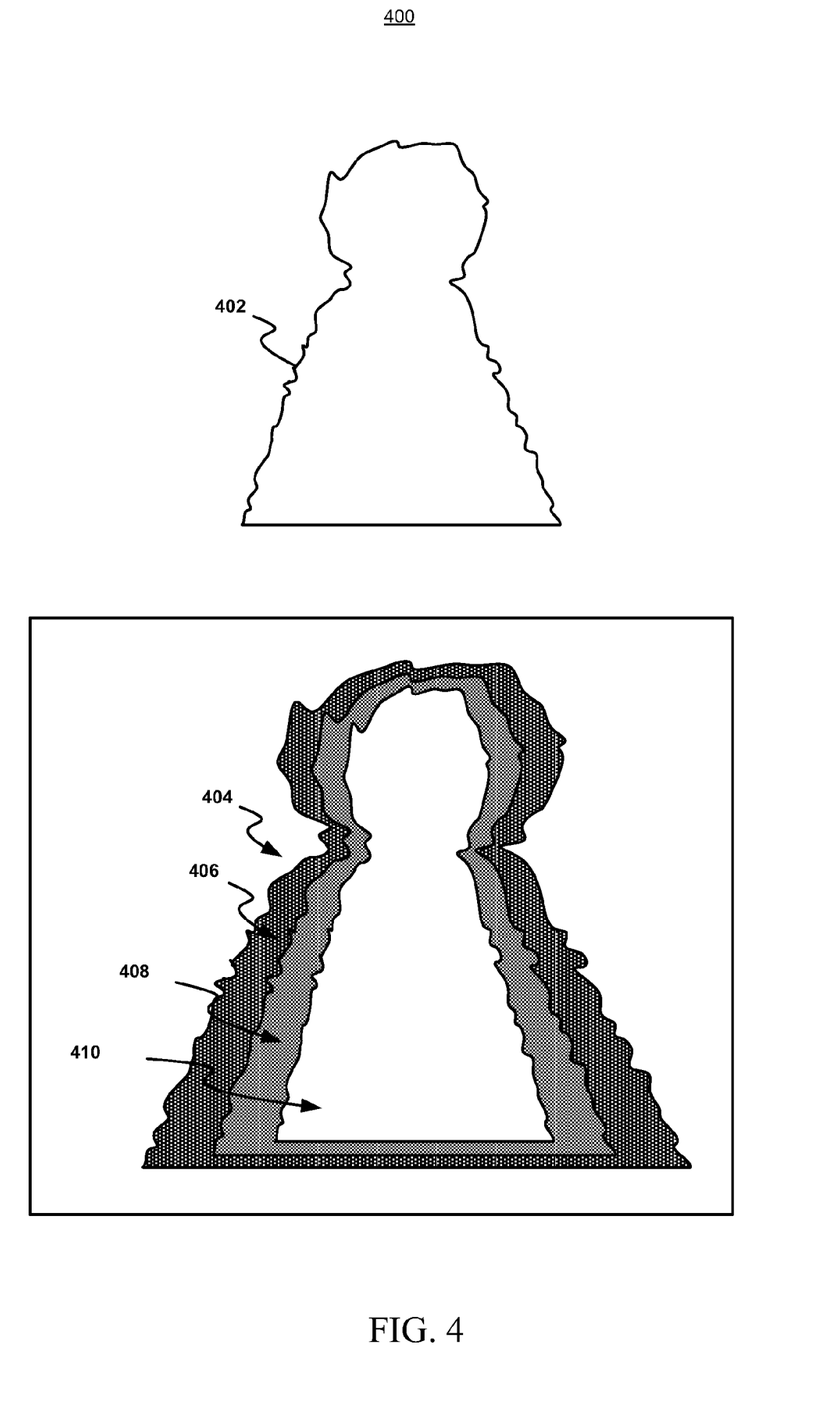
FIG. 4 illustrates a foreground mask and boundary contours consistent with an exemplary embodiment of the present disclosure.

The coarse local foreground mask generated by coarse segmentation module 306 may include inaccuracies at object boundaries. For this reason, the coarse foreground mask and the color image provided by color imaging camera 304 are supplied to boundary refinement module 308 which performs layer banding 316, graph cut processing 318 and applies a smoothing filter 320 to generate a refined local foreground mask. Layer banding module 316 operates on a contour 402 of the coarsely segmented foreground layer as illustrated in FIG. 4. A first band 408 of N pixels width along the inside of the contour 402 is identified as "probably foreground." A second band 406, also N pixels wide, along the outside of the contour 402 is identified as "probably background." All remaining pixels inside the foreground area 410 are identified as "foreground" and all remaining pixels outside the foreground area 404 are identified as "background." All pixels, with their band identifications and associated color values from the color image, are passed to the graph cut module 318 to generate foreground boundaries with increased accuracy. Smoothing filter module 320, which may be a Gaussian filter, smoothes the foreground boundaries to generate the refined local foreground mask.

Figure 5:
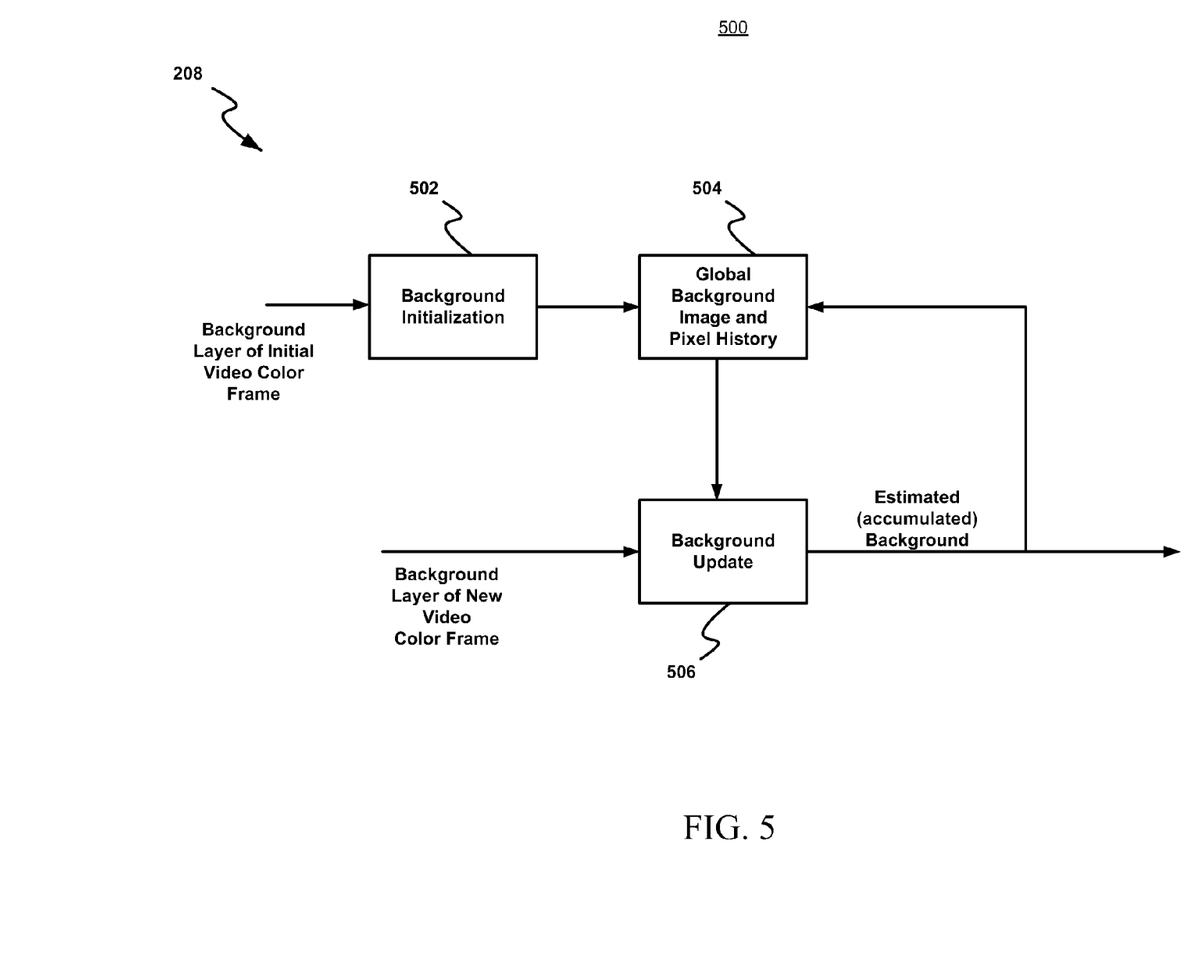
FIG. 5 illustrates additional block diagram details of a background estimation module of an exemplary embodiment consistent with the present disclosure.

FIG. 5 illustrates additional block diagram details 500 of an exemplary embodiment of the background estimation module 208 consistent with the present disclosure. Background estimation module 208 is shown to include background initialization module 502, global background image and pixel history memory module 504, and background update module 506. Background estimation module 208 tracks the global background image of the remote user's environment for two purposes. First, the rendered 3D perception view will typically present a view of the remote scene to the local user from an angle that differs from the actual angle of the remote physical camera and therefore need to synthesize or estimate portions of the remote background that are occluded from the remote camera by the remote user in the foreground. The foreground person is generally not static, however, and will not occlude the same portion of the background continuously, so tracking the background permits an aggregation of the non-occluded regions over time to create a global background image. The second purpose arises from the fact that the remote background environment is generally not static either. The scenery may change, people may pass by and/or the lighting environment may vary. Background tracking allows for adaptation to these changes.

Background initialization module 502 initializes a global background image using pixels from the extracted remote background layer of the first video frame. Background update module 506 updates the global background image by incorporating new background pixels from extracted remote background layers of new received video frames and maintaining the updated background image and pixel history in the memory module 504 provided for that purpose.

During initialization, all visible background pixels in the first video frame of the remote user $P_0(x,y)$ are used to initialize the corresponding background pixels in a global background image 504, i.e. $B_0(x,y)=P_0(x,y)$. The remaining background pixels in the global background image are occluded by the remote foreground and remain uninitialized.

During the background update 506, each visible background pixel in the $i^{th}$ video frame $P_i(x,y)$ is examined together with its corresponding global background image pixel $B_{i-1}(x,y)$. If $B_{i-1}(x,y)$ has been previously occluded and uninitialized, it is updated as $B_i(x,y)=P_i(x,y)$. If $B_{i-1}(x,y)$ has already been initialized, it is updated as $$B_i(x,y)=w(x,y)*P_i(x,y)+(1-w(x,y))*B_{i-1}(x,y),$$

where $w(x,y)$ is determined by a measure of similarity between $P_i(x,y)$ and the pixel history of $(x,y)$. For example, the N most recent color values of each global background image pixel may be recorded as the pixel's history $H_{i-k}(x,y)$ (k=1, 2, ..., N), and $w(x,y)$ may be determined by the normalized distance between $P_i(x,y)$ and the average of $H_{i-k}(x,y)$ in three-dimensional red-green-blue (R,G,B) color space. For example, $$w(x,y)=1-|P_i(x,y)-\text{avg}(H_{i-k}(x,y))|/(3*255),$$

where |.| may be any distance metric, such as, for example an L1 or L2 distance metric.

If $B_{i-1}(x,y)$ has already been initialized but its corresponding pixel in the $i^{th}$ video frame is a foreground pixel, it may be updated as $B_i(x,y)=B_{i-1}(x,y)$. However, due to background lighting changes and/or camera automatic white balance adjustments, the intensity of a background pixel may change significantly from one frame to the next. Assuming this intensity change can be modeled by a linear function, $B_i(x,y)$ may be updated as $$B_i(x,y)=a+b*B_{i-1}(x,y),$$

where a and b may be computed by solving the linear equation $$I_i=a+b*I_{i-1}$$

where $I_i$ and $I_{i-1}$ are the average intensity of the background regions of current and previous remote video frames respectively.

Figure 6:
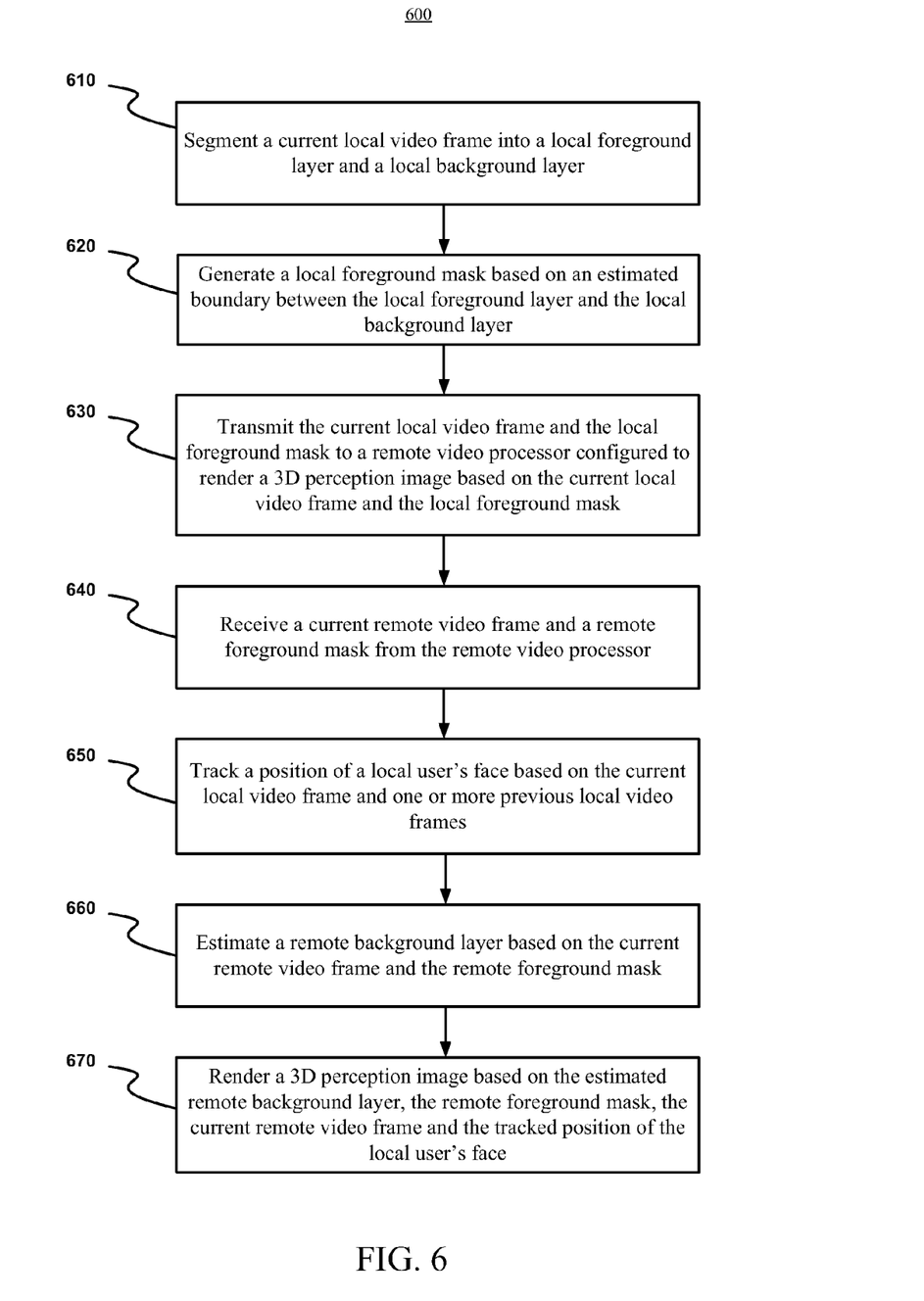
FIG. 6 illustrates a flowchart of operations of an exemplary embodiment consistent with the present disclosure.

FIG. 6 illustrates a flowchart of operations 600 of an exemplary embodiment consistent with the present disclosure. At operation 610, a current local video frame is segmented into a local foreground layer and a local background layer. At operation 620, a local foreground mask is generated based on an estimated boundary between the local foreground layer and the local background layer. At operation 630, the current local video frame and the local foreground mask are transmitted to a remote video processor configured to render a 3D perception image based on the current local video frame and the local foreground mask. At operation 640, a current remote video frame and a remote foreground mask are received from the remote video processor. At operation 650, a position of the local user's face is tracked based on the current local video frame and one or more previous local video frames. At operation 660, a remote background layer is estimated based on the current remote video frame and the remote foreground mask. At operation 670, a 3D perception image is rendered based on the estimated remote background layer, the remote foreground mask, the current remote video frame and the tracked position of the local user's face.

In some embodiments, dual cameras may be available at either or both of the local and remote platforms. When dual cameras are available, additional depth information may be obtained from pixel disparity between the two cameras. This additional depth information may supplement or replace the depth information obtained from the depth imaging camera described previously.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a methods and systems for real-time video communication with three dimensional perception image rendering through generated parallax effects based on identification, segmentation and tracking of foreground and background layers of an image.

The method may include segmenting a current local video frame into a local foreground layer and a local background layer. The method of this example may also include generating a local foreground mask based on an estimated boundary between the local foreground layer and the local background layer. The method of this example may further include transmitting the current local video frame and the local foreground mask to a remote video processor configured to render a 3D perception image based on the current local video frame and the local foreground mask. The method of this example may further include receiving a current remote video frame and a remote foreground mask from the remote video processor. The method of this example may further include tracking a position of a local user's face, the tracking based on the current local video frame and one or more previous local video frames. The method of this example may further include estimating a remote background layer based on the current remote video frame and the remote foreground mask. The method of this example may further include rendering a 3D perception image based on the estimated remote background layer, the remote foreground mask, the current remote video frame and the tracked position of the local user's face.

Another example method includes the forgoing operations and the current local video frame includes a local color video image frame and a local image depth data frame and the transmitting of the current local video frame includes transmitting the local color video image frame.

Another example method includes the forgoing operations and the generating of the local foreground mask further includes generating a coarse foreground mask based on the local image depth data frame and further includes generating a refined foreground mask based on the coarse foreground mask and the local color video image frame.

Another example method includes the forgoing operations and the generating the coarse foreground mask further includes de-noise filtering, thresholding and connected component analysis.

Another example method includes the forgoing operations and the generating the refined foreground mask further includes layer banding, graph cut processing, and smooth filtering.

Another example method includes the forgoing operations and the rendering further includes extracting a remote foreground layer from the current remote video frame based on the remote foreground mask and compositing the extracted remote foreground layer and the estimated remote background layer, and the extracted remote foreground layer is positioned at an offset relative to the estimated remote background layer, the relative offset based on the tracked position of the local user's face.

Another example method includes the forgoing operations and the estimated remote background layer is positioned at a first offset, $O_1=+k_b*d$ and the extracted remote foreground layer is positioned at a second offset, $O_2=-k_f*d$, and d is a motion vector including distance and direction associated with the tracked position of the local user's face position, $k_b$, is a scale factor in the range of 0 to 1 and $k_f$ is a scale factor in the range of 0 to 1.

Another example method includes the forgoing operations and $k_f>k_b$, and $k_f$ and $k_b$ are selected to generate parallax in the rendered 3D perception image.

According to another aspect there is provided a system. The system may include an image segmentation module configured to segment a current local video frame into a local foreground layer and a local background layer and to generate a local foreground mask based on an estimated boundary between the local foreground layer and the local background layer, and the current local video frame includes a local color video image frame and a local image depth data frame. The system of this example may also include a face tracking module configured to track a position of a local user's face based on the current local video frame and one or more previous local video frames. The system of this example may further include a background layer estimation module configured to estimate a remote background layer associated with a current remote video frame and a remote foreground mask received from a remote video processor. The system of this example may further include an image rendering module configured to render a 3D perception image based on the estimated remote background layer, the current remote video frame and the remote foreground mask received from the remote video processor, and the tracked position of the local user's face.

Another example system includes the forgoing components and the image segmentation module further includes a coarse segmentation module configured to generate a coarse foreground mask based on the local image depth data frame and further includes a boundary refinement module configured to generate a refined foreground mask based on the coarse foreground mask and the local color video image frame.

Another example system includes the forgoing components and the coarse segmentation module further includes a de-noise filtering module, a thresholding module coupled to the de-noise filtering module, and a connected component analysis module coupled to the thresholding module.

Another example system includes the forgoing components and the boundary refinement module further includes a layer banding module, a graph cut processing module coupled to the layer banding module, and a smooth filtering coupled to the graph cut processing module.

Another example system includes the forgoing components and the rendering module is further configured to extract a remote foreground layer from the current remote video frame based on the remote foreground mask and composite the extracted remote foreground layer and the estimated remote background layer, and the extracted remote foreground layer is positioned at an offset relative to the estimated remote background layer, the relative offset based on the tracked position of the local user's face.

Another example system includes the forgoing components and the rendering module is further configured to position the estimated remote background layer at a first offset, $O_1=+k_b*d$ and to position the extracted remote foreground layer at a second offset, $O_2=-k_f*d$ and d is a motion vector including distance and direction associated with the tracked local user's face position, $k_b$, is a scale factor in the range of 0 to 1 and $k_f$ is a scale factor in the range of 0 to 1.

Another example system includes the forgoing components and $k_f>k_b$, and $k_f$ and $k_b$ are selected to generate parallax in the rendered 3D perception image.

According to another aspect there is provided at least one computer-readable storage medium having instructions stored thereon which when executed by a processor, cause the processor to perform the steps of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for generating three dimensional (3D) perception, said method comprising:
segmenting a current local video frame into a local foreground layer and a local background layer;

generating a local foreground mask based on an estimated boundary between said local foreground layer and said local background layer;

transmitting said current local video frame and said local foreground mask to a remote video processor configured to render a 3D perception image based on said current local video frame and said local foreground mask;

receiving a current remote video frame and a remote foreground mask from said remote video processor;

tracking a position of a local user's face, said tracking based on said current local video frame and one or more previous local video frames;

estimating a remote background layer based on said current remote video frame and said remote foreground mask; and rendering a 3D perception image based on said estimated remote background layer, said remote foreground mask, said current remote video frame and said tracked position of said local user's face.

2. The method of claim 1, wherein said current local video frame comprises a local color video image frame and a local image depth data frame and wherein said transmitting said current local video frame comprises transmitting said local color video image frame.

3. The method of claim 2, wherein said generating said local foreground mask further comprises generating a coarse foreground mask based on said local image depth data frame and further comprises generating a refined foreground mask based on said coarse foreground mask and said local color video image frame.

4. The method of claim 3, wherein said generating said coarse foreground mask further comprises de-noise filtering, thresholding and connected component analysis.

5. The method of claim 3, wherein said generating said refined foreground mask further comprises layer banding, graph cut processing, and smooth filtering.

6. The method of claim 1, wherein said rendering further comprises extracting a remote foreground layer from said current remote video frame based on said remote foreground mask and compositing said extracted remote foreground layer and said estimated remote background layer, wherein said extracted remote foreground layer is positioned at an offset relative to said estimated remote background layer, said relative offset based on said tracked position of said local user's face.

7. The method of claim 6, wherein said estimated remote background layer is positioned at a first offset, $O_1=+k_b*d$ and said extracted remote foreground layer is positioned at a second offset, $O_2=-k_f*d$, wherein d is a motion vector comprising distance and direction associated with said tracked position of said local user's face position, $k_b$, is a scale factor in the range of 0 to 1 and $k_f$ is a scale factor in the range of 0 to 1.

8. The method of claim 7, wherein $k_f > k_b$, and $k_f$ and $k_b$ are selected to generate parallax in said rendered 3D perception image.

9. A system for generating three dimensional (3D) perception, said system comprising:

an image segmentation module configured to segment a current local video frame into a local foreground layer and a local background layer and to generate a local foreground mask based on an estimated boundary between said local foreground layer and said local background layer, wherein said current local video frame comprises a local color video image frame and a local image depth data frame;

a face tracking module configured to track a position of a local user's face based on said current local video frame and one or more previous local video frames;

a background layer estimation module configured to estimate a remote background layer associated with a current remote video frame and a remote foreground mask received from a remote video processor; and an image rendering module configured to render a 3D perception image based on said estimated remote background layer, said current remote video frame and said remote foreground mask received from said remote video processor, and said tracked position of said local user's face.

10. The system of claim 9, wherein said image segmentation module further comprises a coarse segmentation module configured to generate a coarse foreground mask based on said local image depth data frame and further comprises a boundary refinement module configured to generate a refined foreground mask based on said coarse foreground mask and said local color video image frame.

11. The system of claim 10, wherein said coarse segmentation module further comprises a de-noise filtering module, a thresholding module coupled to said de-noise filtering module, and a connected component analysis module coupled to said thresholding module.

12. The system of claim 10, wherein said boundary refinement module further comprises a layer banding module, a graph cut processing module coupled to said layer banding module, and a smooth filtering coupled to said graph cut processing module.

13. The system of claim 9, wherein said rendering module is further configured to extract a remote foreground layer from said current remote video frame based on said remote foreground mask and composite said extracted remote foreground layer and said estimated remote background layer, wherein said extracted remote foreground layer is positioned at an offset relative to said estimated remote background layer, said relative offset based on said tracked position of said local user's face.

14. The system of claim 13, wherein said rendering module is further configured to position said estimated remote background layer at a first offset, $O_1=+k_b*d$ and to position said extracted remote foreground layer at a second offset, $O_2=-k_f*d$ wherein d is a motion vector comprising distance and direction associated with said tracked local user's face position, $k_b$, is a scale factor in the range of 0 to 1 and $k_f$ is a scale factor in the range of 0 to 1.

15. The system of claim 14, wherein $k_f > k_b$, and $k_f$ and $k_b$ are selected to generate parallax in said rendered 3D perception image.

16. A non-transitory computer-readable storage medium having instructions stored thereon which when executed by a processor result in the following operations for generating three dimensional (3D) perception, said operations comprising:

segmenting a current local video frame into a local foreground layer and a local background layer;

generating a local foreground mask based on an estimated boundary between said local foreground layer and said local background layer;

transmitting said current local video frame and said local foreground mask to a remote video processor configured to render a 3D perception image based on said current local video frame and said local foreground mask;

receiving a current remote video frame and a remote foreground mask from said remote video processor;

tracking a position of a local user's face, said tracking based on said current local video frame and one or more previous local video frames;

estimating a remote background layer based on said current remote video frame and said remote foreground mask; and rendering a 3D perception image based on said estimated remote background layer, said remote foreground mask, said current remote video frame and said tracked position of said local user's face.

17. The non-transitory computer-readable storage medium of claim 16, wherein said current local video frame comprises a local color video image frame and a local image depth data frame and wherein said transmitting said current local video frame comprises transmitting said local color video image frame.

18. The non-transitory computer-readable storage medium of claim 17, wherein said generating said local foreground mask further comprises the operations of generating a coarse foreground mask based on said local image depth data frame and further comprises generating a refined foreground mask based on said coarse foreground mask and said local color video image frame.

19. The non-transitory computer-readable storage medium of claim 18, wherein said generating said coarse foreground mask further comprises the operations of de-noise filtering, thresholding and connected component analysis.

20. The non-transitory computer-readable storage medium of claim 18, wherein said generating said refined foreground mask further comprises the operations of layer banding, graph cut processing, and smooth filtering.

21. The non-transitory computer-readable storage medium of claim 16, wherein said rendering further comprises the operations of extracting a remote foreground layer from said current remote video frame based on said remote foreground mask and compositing said extracted remote foreground layer and said estimated remote background layer, wherein said extracted remote foreground layer is positioned at an offset relative to said estimated remote background layer, said relative offset based on said tracked position of said local user's face.

22. The non-transitory computer-readable storage medium of claim 21, wherein said estimated remote background layer is positioned at a first offset, $O_1=k_b*d$ and said extracted remote foreground layer is positioned at a second offset, $O_2=-k_f*d$, wherein d is a motion vector comprising distance and direction associated with said tracked position of said local user's face position, $k_b$, is a scale factor in the range of 0 to 1 and $k_f$ is a scale factor in the range of 0 to 1.

23. The non-transitory computer-readable storage medium of claim 22, wherein $k_f > k_b$, and $k_f$ and $k_b$ are selected to generate parallax in said rendered 3D perception image.

* * * * *